(12) United States Patent
Gartner et al.

(10) Patent No.: US 9,386,144 B2
(45) Date of Patent: Jul. 5, 2016

(54) REAL-TIME CUSTOMER FEEDBACK

(75) Inventors: Jeffrey G. Gartner, Hopewell Junction, NY (US); Nathan L. Peacock, Greely (CA); Marc Saunders, Belleville (CA); Glenn Lidstone, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/568,761

(22) Filed: Aug. 7, 2012

(65) Prior Publication Data

US 2014/0044250 A1 Feb. 13, 2014

(51) Int. Cl.
*H04M 3/51* (2006.01)
*H04M 3/523* (2006.01)
*H04M 3/00* (2006.01)

(52) U.S. Cl.
CPC .............. *H04M 3/00* (2013.01); *H04M 3/5175* (2013.01); *H04M 2203/401* (2013.01)

(58) Field of Classification Search
CPC .............................. H04M 3/00; H04M 3/5175
USPC ..................................................... 379/265.09
See application file for complete search history.

(56) References Cited

U.S. PATENT DOCUMENTS

| | | | |
|---|---|---|---|
| 6,959,078 B1 * | 10/2005 | Eilbacher et al. | 379/265.03 |
| 8,275,115 B1 * | 9/2012 | Everingham et al. | 379/265.02 |
| 8,295,465 B2 * | 10/2012 | Altberg et al. | 379/216.01 |
| 2004/0062364 A1 * | 4/2004 | Dezonno et al. | 379/88.14 |
| 2004/0101127 A1 * | 5/2004 | Dezonno et al. | 379/265.02 |
| 2005/0147228 A1 * | 7/2005 | Perrella et al. | 379/265.06 |
| 2006/0062374 A1 * | 3/2006 | Gupta | 379/265.06 |
| 2007/0127693 A1 * | 6/2007 | D'Ambrosio et al. | 379/265.06 |
| 2007/0160054 A1 * | 7/2007 | Shaffer et al. | 370/395.2 |
| 2008/0130842 A1 * | 6/2008 | Johri et al. | 379/88.04 |
| 2008/0152122 A1 * | 6/2008 | Idan et al. | 379/265.07 |
| 2011/0125697 A1 * | 5/2011 | Erhart et al. | 706/47 |
| 2013/0176413 A1 * | 7/2013 | Lowry et al. | 348/77 |
| 2013/0226999 A1 * | 8/2013 | Sarieddine | 709/203 |
| 2014/0098949 A1 * | 4/2014 | Williams | 379/265.09 |

* cited by examiner

*Primary Examiner* — Harry S Hong
(74) *Attorney, Agent, or Firm* — Sheridan Ross P.C.

(57) ABSTRACT

Described are embodiments for providing real time feedback during communication between a customer and a contact center agent to allow a bad customer experience to be mitigated. Embodiments include a system that can identify and mitigate issues that may arise during the communication between the customer and the customer agent including a customer agent's performance, escalation to a supervisor, materials shared with the customer, wait time experience and/or other aspects of the communication. The feedback is provided while the customer and agent are still communicating. The feedback is linked to the specific session and agent. If an issue is identified, steps are taken to mitigate the issue.

20 Claims, 7 Drawing Sheets

REAL-TIME CUSTOMER FEEDBACK

BACKGROUND

A call center agent's effectiveness while handling customer's calls, or via alternative media, is one determining factor for the call center agent's rating, the effectiveness of the call center itself, and ultimately for the success of the company that the call center represents. Call centers often compile metrics via surveys following the call, and sometimes calls are monitored and recorded, but generally all feedback is after the fact, i.e., after the call is completed. This allows the call center management to react when data shows negative trends. However, after a call is completed it is too late to salvage a bad customer experience. The bad experience has already occurred. Since the appearance of social networking, blogs, micro-blogs and other interactive forums, a bad experience can easily be shared with large masses of people. This sharing can occur very quickly using for example, Twitter. Such postings or distribution of negative experiences can quickly have a very negative impact on a company.

Although specific problems and issues have been identified in this background section, the embodiments described herein are not limited to solving these particular problems or issues. The embodiments may be applied to solve problems not described in this background section.

SUMMARY

It is with respect to the above issues and other problems that the embodiments presented herein were contemplated. Embodiments described in the present application provide a system of real time feedback where a bad customer experience can be mitigated while the customer is still engaged with a contact center agent. Embodiments of the system can identify and mitigate issues with an agent's performance, escalation to a supervisor, materials shared with the customer, wait time experience and/or other aspects of the operation of the contact center. The feedback is provided while the customer and agent are interacting. The feedback is linked to the specific session and agent. Resources are applied to improve the perception of the customer-agent experience as it is actively occurring.

In one embodiment, a method is provided that includes establishing a communication session between an agent and a customer. During the communication session, receiving customer feedback. In response to determining that the customer feedback requires some action, e.g., the feedback is negative, initiating an action such as a mitigation step. The feedback is received in some embodiments by a different mode of communication than used for the communication session. In embodiments, the method includes providing a menu such as an audio menu or a displayed menu for receiving the feedback from the customer.

Another embodiment is directed to a communication device that includes a non-transitory computer readable medium, a processor, and an application stored in the computer readable medium and running on the processor. The application, when executed by the processor, establishes a communication session between an agent and a customer. During the communication session, the application receives an indication of customer feedback regarding the communication session; and in response to determining that the customer feedback requires action, e.g., feedback is negative, initiates an action such as a mitigation step. The communication session can be established using one or more of an instant message (IM), email, a short message service (SMS), a multimedia message service (MMS), a wide-area network, and a telephone network. In embodiments, the feedback is received by a different mode of communication than used for the communication session. In other embodiments, the application identifies the customer using stored customer information; and determines the action (e.g., mitigation step) to initiate based in part by the customer information.

Other embodiments are directed to computer readable medium including computer executable instructions stored onto the computer readable medium which, when executed by one or more processors of a computer, causes the computer to perform a method for negotiating a multimedia session. The method includes establishing a communication session between an agent and a customer. During the communication session, receiving an indication of customer feedback regarding the communication session. In response to determining that the customer feedback is negative, initiating a mitigation step. In embodiments, the method additionally includes identifying the customer using stored customer information, and determining the mitigation step to initiate based in part on the customer information.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are described, it should be appreciated that individual aspects of the embodiments can be separately claimed.

The term "feedback" as used herein refers to input from a customer that provides information regarding the customer's experience during a communication session with an agent. The information may involve, but is not limited to, the customer's opinion regarding an agent, the customer's opinion regarding a supervisor, the customer's opinion regarding an expert, the customer's opinion regarding written materials, the customer's opinion regarding information provided by an agent, the customer's mood, the customer's satisfaction level, a customer's stress level, a customer's speech pattern, volume of customer's voice and/or customer request(s).

The term "real time" as used herein refers to a time during a communication session with an agent. For example, "feedback" received in "real time" refers to input received during a communication session.

BRIEF DESCRIPTION OF THE DRAWINGS

The present disclosure is described in conjunction with the appended figures.

Figure 1:
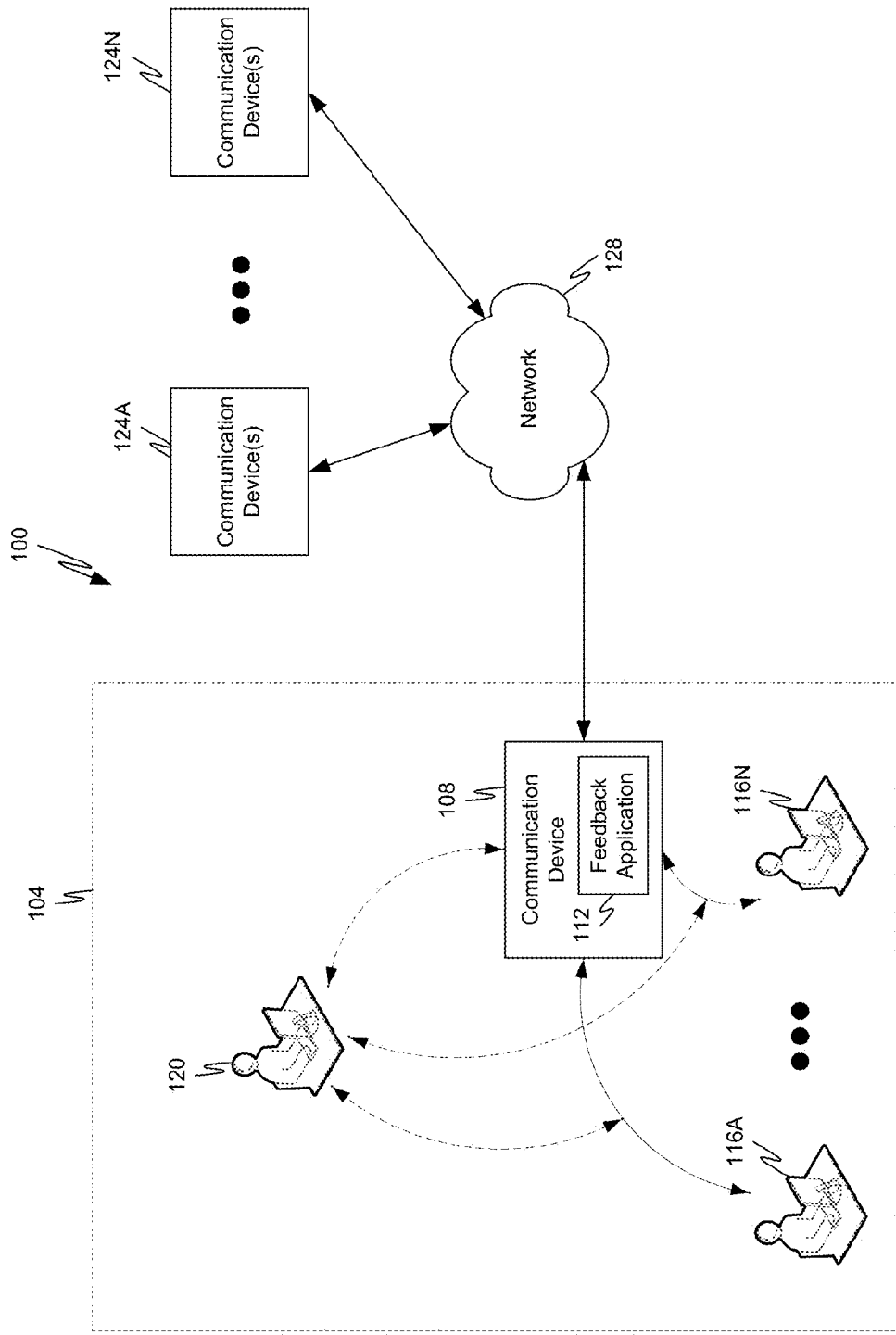
FIG. 1 is a block diagram of a system that receives real time customer feedback according to an embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Described are embodiments for providing real time feedback during communication between a customer and a contact center agent to allow a bad customer experience to be mitigated. Embodiments include a systems and methods for identifying and mitigating issues that may arise during the communication between the customer and the customer agent including a customer agent's performance, escalation to a supervisor, materials shared with the customer, wait time experience and/or other aspects of the communication. The feedback is provided while the customer and agent are still communicating. The feedback is linked to the specific session and agent. If an issue is identified, steps are taken to mitigate the issue.

Embodiments include a call center that can acquire metrics for the effectiveness of a call in real-time that allows for immediate remedial intervention while the call is still in progress. This improves the overall customer satisfaction by allowing a problem to be corrected as its happening rather than after the fact.

Other embodiments are directed to methods that allow for a customer side feedback mechanism (a supervisor chat link, IM, a feedback webpage, DTMF in-band keycodes indicating satisfaction or lack thereof, social media (e.g., Facebook, Twitter, MySpace), video, etc.) that lets a customer provide real-time feedback to the call center on the effectiveness of agent/materials in resolving the customer's issue. Input from the customer is allowed, in embodiments, at any time during the conversation. The feedback mechanism can be any of the forms listed above or reasonable equivalents. The customer feedback can be via in-band signaling and/or an alternative media, webpage or the like. The feedback can be responses to predetermined questions, a satisfaction gradient, or specific user comments. The action or intervention efforts could be switching to a different agent, a supervisor escalation, a subject matter expert and/or better materials supplied to the customer. The determination of the correct action could be based on the feedback and a decision engine with predefined or learning algorithm rules.

In some embodiments, a running average score of all agents or a particular agent is maintained and a supervisor can see trends related to time of day, external events, new release of software etc. or just a red flag is raised on a particular call so appropriate action can be taken. A real-time tag cloud of keywords for an agent or across agents is also used to look for trends on a particular agent or across agents that may be related to a particular event that is happening with a company (new release, product end-of-life, new report, etc).

FIG. 1 illustrates a system 100 that includes a call center 104. Call center 104 includes a communication device 108 (e.g., a central server), which as shown in FIG. 1 is used to manage communication sessions between customers and agents. The customers utilize communication devices such as devices 124A-124N, which are connected to a network 128 also connected to communication device 108. The communication devices 124A-124N include one or more of a desktop computer, laptop computer, tablet computer, other mobile computing device, mobile phone, soft phone, POTS telephone, and/or a PDA. Accordingly, the communication session between customers and agents can include one or more of a voice communication session, web chat (audio and/or video), Internet messaging, or other communication session.

In embodiments, a communication session will include at least voice communication, e.g., a phone call, between a customer and an agent. However, other embodiments are not limited thereto.

In one embodiment, communication device 108 manages and distributes phone calls from customers to agents 116A-116N. As shown in FIG. 1, communication device 108 receives a phone call from a customer and determines what agent should handle the phone call, and connects the phone call to a communication device used by one of the agents 116A-116N. The agents 116A-116N utilize communication devices for handling the calls distributed by centralized server 108. The communication devices used by the agents may include one or more of a desktop computer, laptop computer, tablet computer, other mobile computing device, mobile phone, soft phone, POTS telephone, and/or a PDA.

In the embodiment, shown in FIG. 1, communication device 108 includes a feedback application 112 that allows feedback from customers to be received and provided to the agent handling the customers' calls. The communication devices used by the agents may include a module of the feedback application 112, or a separate application that interacts with the feedback application 112 to provide the customer feedback to the agents. As described in greater detail below, the feedback application 112 not only allows feedback to be received from customers, but also initiates actions in response to feedback received from customers, such as mitigation steps to address negative feedback.

Also shown in FIG. 1, is a third-party 120, which may be included in a communication session between one of the agents 116A-116N and a customer as part of a mitigation step to address negative customer feedback received from a customer. In embodiments, the third-party 120 may be a supervisor of the agents 116A-116N. In other embodiments, the third-party 120 may be an expert that is included in the communication session in order to assist in dealing with customer issues.

In one example of basic operation, a customer utilizing one of communication devices 124A-124N places a phone call that is received by communication device 108. Communication device 108 determines which of agents 116A-116N should handle the phone call. The phone call is then connected to the selected agent. During the phone call, a customer may provide feedback, which is received by the feedback application 112. If the feedback requires some action, feedback application 112 initiates some action. As one example, if the feedback is negative feedback the action may include a mitigation step that involves a third-party 120 in the telephone call. The third-party may be for example a supervisor who communicates with the customer to try to address the issues that are creating the negative feedback; or an expert that can provide expertise to help address the problems creating the negative feedback. Other examples of steps that may be taken to address the feedback include, but are not limited to, alerting the agent to the feedback, querying the customer for additional information, providing the customer additional information, and providing the customer with different options. As indicated in greater detail below, the specific action may be determined using different algorithms and/or rules that are applied by the feedback application 112.

Figure 2:
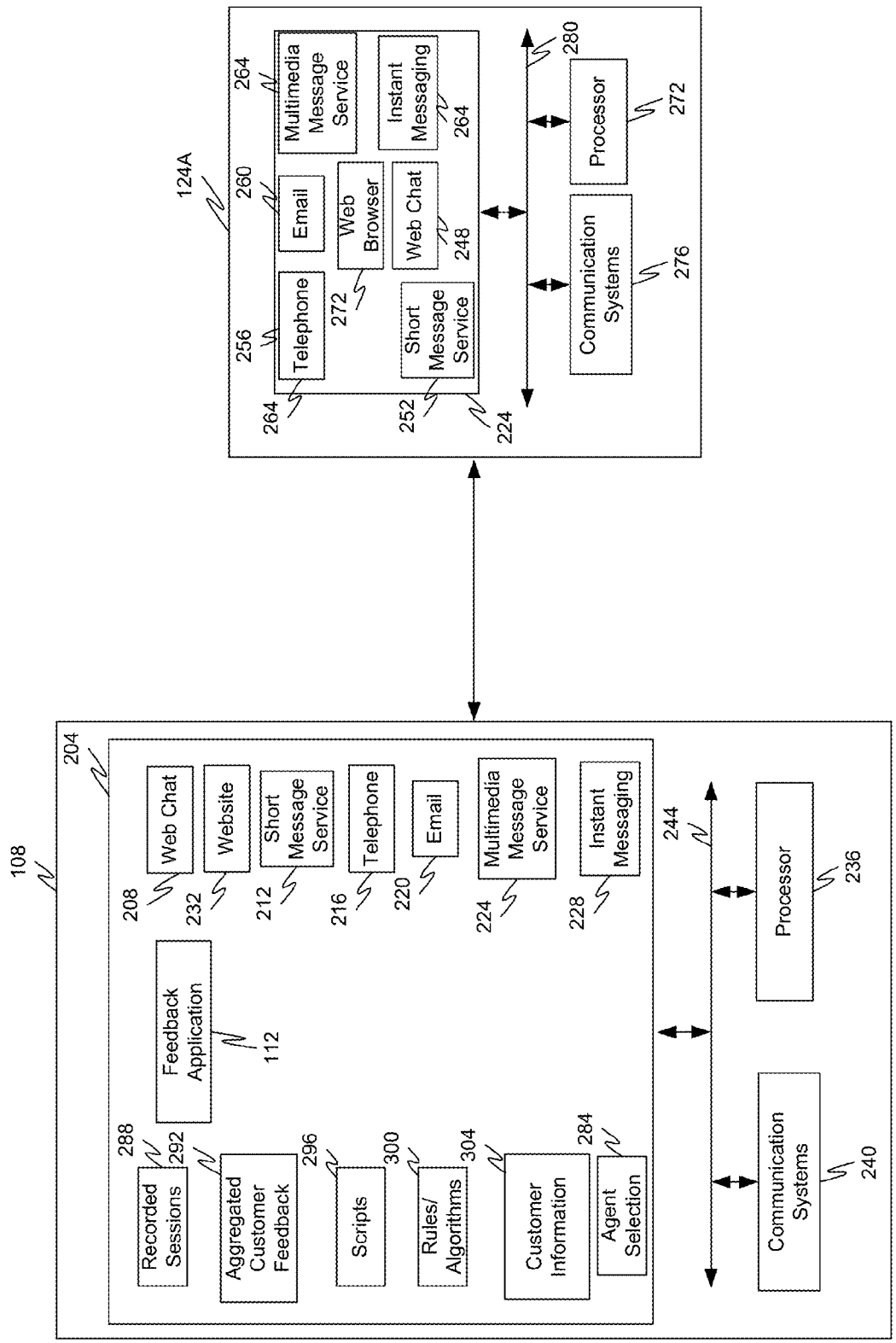
FIG. 2 is a block diagram showing a first communication device in a communication session with a second communication device, the first communication device receiving customer feedback according to an embodiment.

FIG. 2 illustrates a more detailed embodiment of communication device 108, which is shown in FIG. 2 communicating with a communication device 124A being used by a customer. As shown in FIG. 2, communication device 108 includes among other features, memory 204, where files and modules are stored such as feedback application 112, as well as a number of applications for establishing communication sessions (e.g., web chat application 208, SMS service application 212, telephone application 216, e-mail application 220, and MMS service application 224, instant messaging application 228, and website application 232). Communication device 108 also includes additional hardware such as a processor 236 and communication systems 240. The processor 236 is used to execute the code of the applications and modules stored in memory 204. A bus 244 provides a connection for transmitting signals among the memory 204, processor 236, and communication systems 240. In addition, communication device 102A may also include other input/output devices, including but not limited to display(s), e.g., speakers, lights, keypads, and microphones.

Similarly communication device 124A includes a memory 244, where files, modules, and applications are stored. For example, communication device 124A includes applications for establishing communication sessions (e.g., web chat application 248, SMS service application 252, telephone application 256, e-mail application 260, and MMS service application 264, instant messaging application 264, and website application 272). Communication device 124A also includes additional hardware such as a processor 272, and communication systems 276. The processor 272 is used to execute the code of the applications and modules stored in memory 224. A bus 280 provides a connection for transmitting signals among the memory 224, processor 272, and communication systems 276.

Communication device 124A establishes a communication session with device 108. To establish a communication session, communication device 108 may answer a call, create an email, create an SMS message, create an MMS message, answer a request for a web chat, answer a request to enter an instant messaging session, and/or enter a webcast, as some non-limiting examples. This embodiment will be described with respect to a phone call being made by a customer using communication device 124A to the call center 104. The phone call is received by communication device 108. Memory 204 of communication device 108 includes an agent selection application 284. The agent selection application 284 is used to determine which agent 116A-116N should handle the incoming call. After the determination is made, the selected agent is connected to the incoming call.

In accordance with embodiments, the customer may provide feedback during the call between the customer and the agent. The feedback is received by feedback application 112. It is noted that the feedback provided by the customer may be positive or negative. In other words, the embodiments allow the customer an opportunity to provide any type of feedback that the customer desires. The feedback may result in some action being performed based on the type of feedback provided by the customer.

In embodiments, the feedback application determines whether the feedback is of a type that requires action. The description below provides an example in which a customer has provided negative feedback. It is noted that embodiments are not limited to initiating mitigation steps for negative feedback but may also include situations in which the feedback is not negative but requires some action. The example below, which focuses on negative feedback, is provided merely for illustrative purposes.

The feedback application 112 determines that the feedback is negative and decides on what mitigation step(s) should be initiated to improve the customer's experience. The mitigation steps may include one or more of: providing the negative feedback to the agent, querying the customer for additional information, including a third party (an expert or a supervisor) in the call, changing agents, providing the customer with different information, and/or providing the customer with additional options.

In embodiments, the feedback application utilizes rules and/or algorithms 300 stored in memory 204 to determine what mitigation steps to initiate. The rules and/or algorithms 300 in some embodiments utilize information such as customer information 304 stored in memory 204 in determining the mitigation step to take in response to customer feedback. An embodiment of some example rules and/or algorithms 300 stored in memory 204 are illustrated in FIG. 3.

Figure 3:
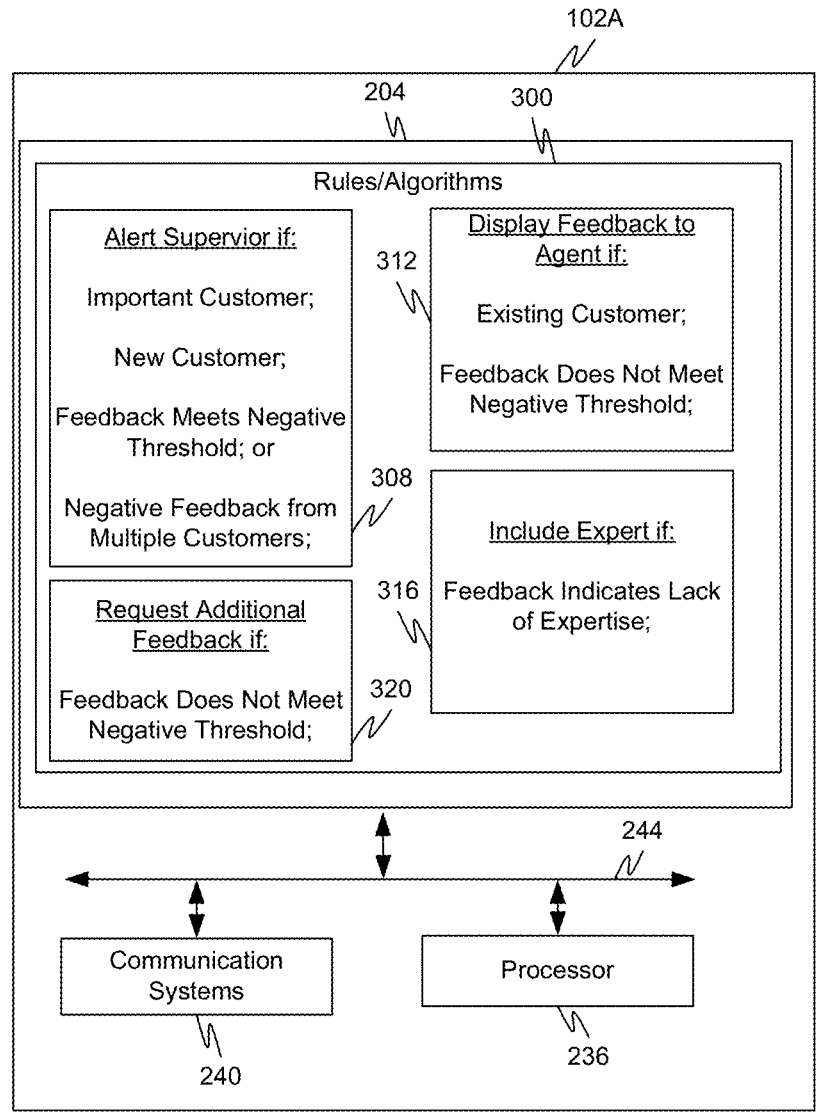
FIG. 3 illustrates a communication device storing rules and algorithms used in determining an action, e.g., mitigation step.

In the embodiment shown in FIG. 3, the rules and/or algorithms indicate when particular mitigation steps should be performed. For example, rule 308 indicates that the mitigation step of alerting a supervisor should be initiated if the customer providing the negative feedback is an important or new customer. As can be appreciated, when dealing with important or new customers, a company may want to ensure that these customers have the highest satisfaction possible. In order to achieve this, rule 308 provides for a supervisor to be contacted anytime a negative reaction is received from an important or new customer, to try and mitigate negative experiences of the important or new customer.

Rule 308 also provides for a supervisor to be alerted if the agent currently receiving negative feedback has in the past received negative feedback from other customers. As can be appreciated, if customers have had negative feedback about an agent on previous occasions, there may be an issue with how the agent handles customer calls. Rule 308 provides for alerting a supervisor to make sure that the agent handles the current customer's concerns correctly. In one embodiment, the rule may provide for contacting the supervisor only if a threshold number of times, in which an agent has received negative feedback, are exceeded. For example, a threshold number can be set at three. The threshold may be set by a supervisor and/or an administrator. In this example, if an agent has received negative feedback from three or more customers (or more than three customers in other embodiments), then on the next occasion that negative feedback is received from a customer about the agent, a supervisor will be alerted.

Rule 308 additionally provides for a supervisor to be alerted if the negative feedback exceeds some negative threshold. For example, in some embodiments, a customer may be allowed to indicate different levels of dissatisfaction with the agent. The customer may be able to indicate a level of dissatisfaction, such as low, medium, or high. A threshold level can be set in rule 308. In one embodiment, the threshold level can be set at medium so that if the level of dissatisfaction is medium or high, then a supervisor will be notified. The threshold may be set by a supervisor and/or an administrator.

Rule 312 indicates when the mitigation step of displaying the negative feedback to the agent should be initiated. As shown in FIG. 3, rule 312 provides that the step should be initiated when the negative feedback the negative feedback does not meet the negative threshold as described above. In other words, if a customer indicates a low level of dissatisfaction then an indication that the customer is dissatisfied is displayed to the agent. Also, rule 312 indicates that when negative feedback is received from an existing customer, the negative feedback is displayed to the agent. Rule 312 may be established based on the notion that existing customers may be less likely to have severe negative reactions, and therefore would not require mitigation steps such as alerting a supervisor.

Rule 316 is provided to determine whether including an expert should be initiated to mitigate the negative feedback. In this embodiment, if the feedback indicates that the customer perceives a lack of expertise on behalf of the agent, then an expert is included in the communication session.

As can be appreciated, in some embodiments more than one mitigation step may be performed in response to receiving negative feedback. Rule 320 indicates that additional information should be requested from the customer if the feedback does not meet the negative threshold. Accordingly, based on the rule 320 and the rule 312 when negative feedback is received and does not meet the negative threshold, the negative feedback will be displayed to the agent (based on rule 312) and additional feedback will be requested from the customer (based on rule 320).

It is noted that the example rules described above with respect to FIG. 3 are merely some examples of rules and actions, e.g., mitigation steps, that may be utilized by feedback application 312. The rules are provided merely for illustrative purposes, and embodiments are not limited to the specific actions or rules shown in FIG. 3 or described above. For example, in other embodiments an action may involve directing a customer to an online web chat or webcast that is currently active, or will be active in the future. Rules may be established, based on factors such as availability of the web chat/webcast or subject matter of the customer's concern, for when this action is initiated. Also, the actions may not be performed to mitigate any negative feedback, but rather to provide additional information, offer different products or services, or other action performed in response to positive or neutral feedback and not negative feedback.

Referring back to FIG. 2, the feedback received by feedback application 112 can be provided by customers in a number of different ways. In one embodiment, the feedback is provided by a customer using the same communication mode used to establish the communication session. If the communication session is a telephone call, the feedback can be provided by the customer using the telephone. As one example, during the call, a menu can be provided to a customer to allow the customer to indicate levels of satisfaction using the number keys on a telephone. The feedback would be encoded using dual-tone multi-frequency codes. In some embodiments, the tones would be received by the feedback application 112 and filtered so that the agent that is on the call with a customer does not hear the tones.

Figure 4:
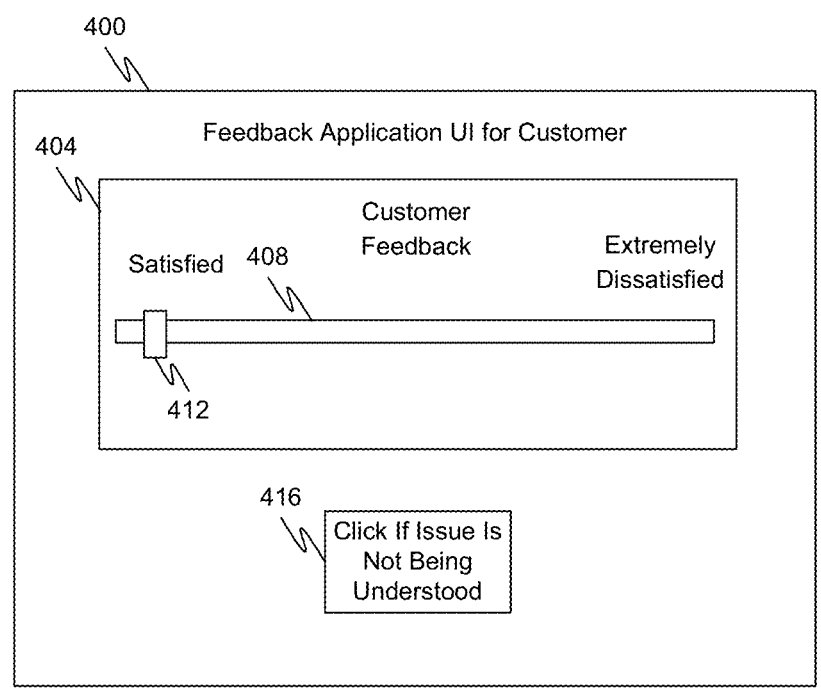
FIG. 4 illustrates a user interface that may be displayed to an agent in a communication session with a customer that provides real time feedback.

In other embodiments, the feedback may be provided by a different mode of communication than is used for the communication session. For example, if a communication session is a phone call, a customer may be allowed to provide the feedback using a website. FIG. 4 illustrates a user interface 400 that may be displayed on a website that is accessible to a customer to allow the customer to provide feedback while on a telephone call with an agent. As shown in FIG. 4, user interface 400 includes a feedback element 404 which allows a user to indicate a level of satisfaction with the phone call. Element 404 includes a sliding scale 408 and an indicator 412. At any time during the phone call, a user can move indicator 412 to express a level of satisfaction with the communication session. The user interface 400 also includes a button 416 that a user can click if the customer does not believe that his or her issue is being understood. User interface 400 is merely one example of how customers can provide feedback, and other embodiments are not limited to the user interface 400. Also, embodiments of user interface 400 may be displayed on a website, an e-mail, in a multimedia message or by some other communications means to allow the customer to provide feedback. Other modes of communication that may be used by a customer to provide feedback include, without limitation, social networks (Facebook, Twitter, MySpace), DTMF codes, video streaming.

In some embodiments, the feedback is provided in response to a request sent by feedback application 112. In these embodiments, feedback application 112 may be configured to request feedback from the customer on a predetermined schedule. For example, the feedback application 112 may be configured to request feedback on a 1 minute interval. Accordingly, every minute, feedback application 112 may prompt the customer for feedback. The customer can then utilize the keypad on a telephone or a displayed user interface to provide feedback. In some embodiments, a customer is free to provide feedback at any time and is also prompted periodically by feedback application 112 to provide feedback. In other embodiments, a customer is only allowed to provide feedback when requested by feedback application 112.

It is noted that in some embodiments, the feedback received by feedback application 112 is not provided by customer using a menu or display. In some embodiments, the negative feedback received from a customer is detected by feedback application 112. The feedback application 112 may detect signs of stress in a customer. As one example, feedback application 112 may detect speech patterns such as a customer repeating themselves, speaking louder, pitch changes, or other signs that are interpreted as negative feedback. In response, the feedback application 112 may initiate a mitigation step.

As can be appreciated, the communication sessions between customer and an agent, and the feedback provided by the customer during the communication session, can utilize various communication modes. Some examples including, without limitation: web chat, websites, short message service (text messages), multimedia message service (multimedia messages), instant messaging, telephone systems, and e-mail.

Figure 5:
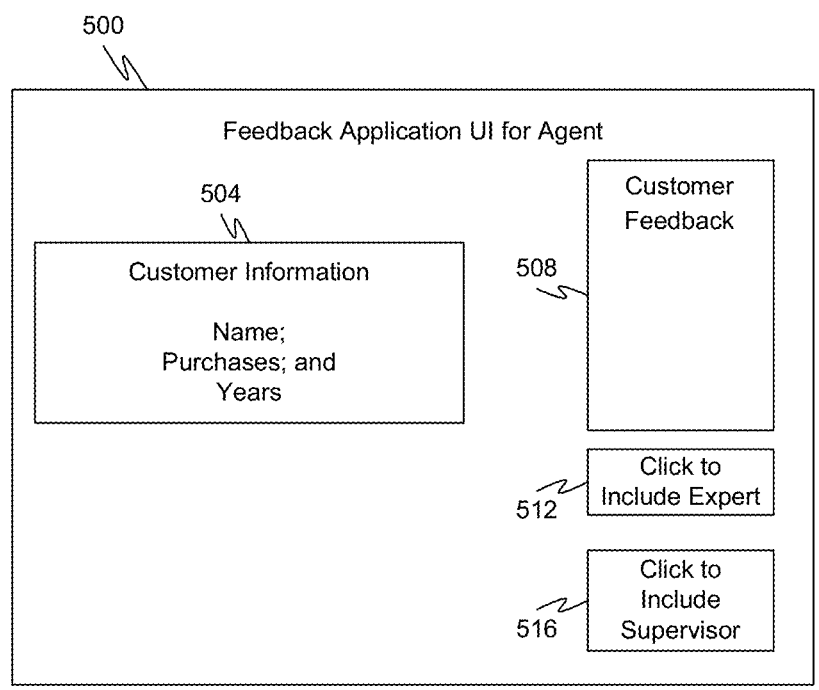
FIG. 5 illustrates a user interface for providing real time feedback that may be displayed to a customer in a communication session with an agent.

FIG. 5 illustrates a user interface 500 that may be displayed to an agent while an agent is in the communication session with a customer. As illustrated in FIG. 5, user interface 500 may display customer information 504. The customer information may include a customer name, previous purchases, years as being the customer, and other relevant information.

In addition, user interface 500 may also display customer feedback 508. Customer feedback 508 can provide information to a user about both negative and positive feedback. As noted above, one mitigation step that may be initiated by feedback application 112 is to display the negative feedback to an agent. The customer feedback 508 may include the negative feedback or other feedback that is provided to an agent by feedback application 112. In addition, two buttons 512 and 516 are displayed that allow an agent to include a third-party, such as an expert 512, or a supervisor button 516. These buttons may be provided to allow a user to react to the customer feedback 508. Thus, even though feedback application 112 may have established rules for determining when a third-party should be included in a conversation, the buttons 512 and 516 give the agent an option of including the third-party if they believe it is necessary to keep the customer satisfied.

In other embodiments, user interface 500 may include an additional button(s) or other displayed elements that allow an agent to provide feedback to a feedback application. For example, if an agent senses that the conversation with the customer is not going well, but the customer has not provided by feedback, the agent may trigger actions by providing feedback so that actions can be taken. In other words, actions such as providing additional information to a customer, including a supervisor in the communication session, including an expert in the communication session, querying the customer for additional information, etc. may be triggered by the agent. The feedback can be for example the agent requesting particular steps, such as pressing buttons 512 and/or 516 to include a third party into the communication session. In other embodiments, the agent may provide more general feedback, which a feedback application can use to determine whether and/or what actions should be taken.

Referring again to FIG. 2, in addition to receiving feedback and determining mitigation steps for improving the communication session with the customer, the feedback application 112 may also provide additional functionality. For example, the feedback application may have communication sessions recorded and stored in memory 204, as illustrated by recorded sessions 288 in FIG. 2. The recorded sessions 288, in addition to the communications between the customer and the agent, also include any feedback provided by the customer to the agent during the communication sessions. The recorded sessions 288 may be utilized in a variety of ways. As one example, the recorded sessions may be utilized as a training tool. For example, recorded sessions may be played back to illustrate that when an agent used particular language or responded to a customer in a particular way, there was immediate negative feedback. This can teach agents what language to avoid and how to respond to customers.

In another example, the recorded sessions can be parsed to search for keywords that may correspond to negative feedback provided by the customer. For example, if all of the recorded sessions that include negative feedback include the words "new product" perhaps a trend can be identified regarding a company's new product. Additionally, perhaps a particular issue with the new product can be identified and solved relatively quickly.

The feedback application may also be used to generate metrics for an agent or a group of agents. To generate metrics, the feedback application may store aggregated customer feedback 292 in memory 204. The aggregated customer feedback may include information such as how many times a customer provides negative feedback when communicating with a particular agent or a group of agents. A supervisor can then utilize this information to identify agents that require additional training or for other purposes, such as promotion or demotion.

In some embodiments, agents utilize scripts when handling calls from customers. One feature that may be useful in some embodiments is the ability to determine whether the negative customer feedback is based on information from the scripts being used by an agent. Scripts 296 can be stored in memory 204. The recorded sessions 288 can be used to determine what time the negative feedback was received from the customer, and scripts 296 are used to determine what portion of a script the agent was reading when the negative feedback was received. This information can then be used to revise scripts to take out information that regularly results in negative feedback from customer.

Other embodiments of feedback application 112 can provide additional functionality including, but not limited to the specific examples, described above. The examples above are provided merely for illustrative purposes, and other embodiments can utilize the feedback from customers in additional ways.

Figure 6:
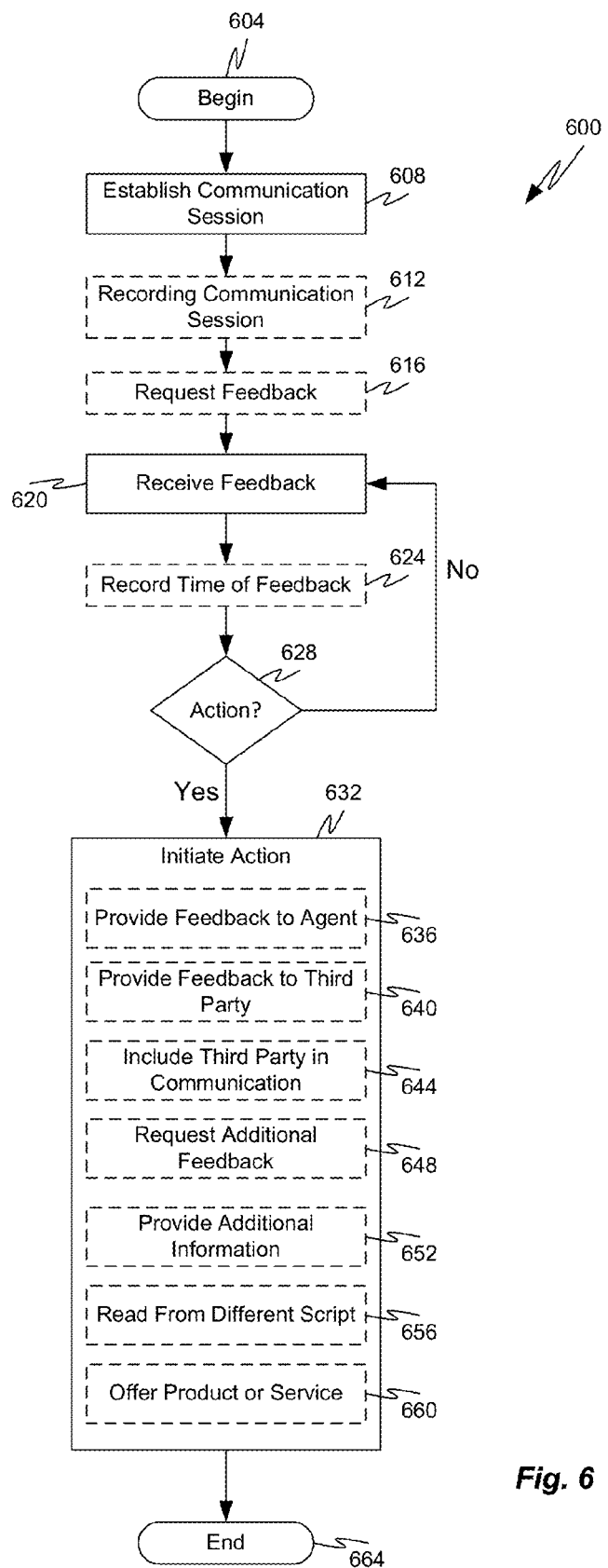
FIG. 6 is a flow diagram of an embodiment of a process for establishing a communication session and receiving feedback.

Referring now to FIG. 6, a flow diagram 600, for negotiating a multimedia session, e.g., a videoconference. Flow 600 is in embodiments performed by a computing device such as communication device 102A (FIGS. 1-2) or other computing device. More specifically, one or more hardware or software components may be involved in performing flow 600. For example, portions of flow 600 may be performed by a feedback application, e.g. feedback application 112.

Flow 600 begins at 604 and passes to step 608 where a communication session is established with a customer and an agent. As noted above, the communication session may be established using any type of communication mode including, without limitation, web chat, websites, short message service (text messages), multimedia message service (multimedia messages), instant messaging, telephone systems, and e-mail.

After step 608, flow passes to optional step 612 where the communication session is recorded. Step 612 may be useful for providing a number of functionalities. For example, the recorded sessions may be used in training, to identify trends, identify metrics, or for other purposes.

Flow 600 includes an optional step 616 for requesting feedback. Step 616 may involve prompting a customer for feedback at predetermined times. As one example, step 616 may involve requesting feedback from the customer on a periodic basis, e.g., every minute or every minute and a half. Step 616 may involve audio prompts, video prompts, visual prompts, or other prompts to request feedback from the customer.

From step 616, flow 600 passes to step 620 where feedback is received from a customer. The feedback is received in some embodiments using the same communication mode used to establish the communication session at step 608. If the communication session is a telephone call, the feedback may be received using a telephone system and/or wide area network if the telephone call utilizes VoIP. As one example, an audio menu can be provided to a customer to allow the customer to indicate levels of satisfaction using the number keys on a telephone. The feedback would be encoded using dual-tone multi-frequency (DTMF) codes and received by a feedback application. In some embodiments, the tones are filtered so that the agent that is communicating with a customer does not hear the tones.

In other embodiments, the feedback may be provided by a different mode of communication than is used to establish the communication session at step 608. For example, if a communication session is a telephone call, the feedback may be received through a website, an e-mail, a multimedia message, a short message service message, web chat, web cast, instant messaging message, social network message (Facebook, Twitter, MySpace etc.) or by some other communication mode.

In other embodiments, the feedback received at step 620 is detected without the need for a customer to provide input. For example, step 620 may involve detecting signs of stress, such as detecting speech patterns, speech volume, pitch changes, or other signs that may be interpreted as feedback from a customer. In one embodiment, a feedback application may subscribe to customers' social network accounts, e.g., Twitter, and receive messages sent by the customer. This may allow the feedback application to determine that the customer has sent a message that may require the call center to take some action. For example, a customer may send, e.g., tweet, a message describing a negative experience during the communication session, which the feedback application can receive. As a result of receiving the message, the feedback application may take some action.

Flow 600 flows from step 620 to optional step 624, where the time of receipt of the feedback is recorded. Optional step 624 can be done as part of step 612, which records the communication session. Step 624 can also be useful in generating metrics, e.g., the length of time, on average; after a communication session has started do customers begin providing feedback. In embodiments, the information recorded at step 624 is stored with the session information recorded at step 612.

After step 624, flow 600 passes to decision 628 where a determination is made regarding whether the feedback requires some action or intervention to be performed. The feedback may be positive, negative, or neutral and still result in a determination at step 628 that an action should be taken. For example, the feedback may be positive feedback indicating that the customer feels comfortable and is having a good experience. In some embodiments, this may result in the agent changing scripts to provide different information to the customer. The changes may for example present the customer with other products or services that a company can provide. In other words, the positive feedback may be leveraged to provide an up-sell or cross-sell opportunity.

The feedback may be neutral but a determination may still be made at decision 628 that an action should be taken. For example, at decision 628 a determination may be made that the feedback indicates that the customer requires some additional information. As another example, the feedback may be negative. In these embodiments, a determination is made at decision 628 that a mitigation step should be performed to address the negative feedback. In some embodiments, the feedback received at step 620 may not indicate that any action should be taken. Thus, if a determination is made at decision 628 that the feedback does not require some action, flow 600 passes back to step 620 where additional feedback is received.

If at decision 628 a determination is made that the feedback does require some action, then flow passes to step 628 where a step is initiated based on pre-established rules or algorithms. The algorithms or rules may be created by a supervisor, an administrator, or someone else in charge of managing agents and/or customers. The rules may utilize other information such as customer information when determining the specific mitigation steps to initiate. In one embodiment, the algorithms or rules are similar to those described above with respect to FIG. 3. In other embodiments, the algorithms or rules may indicate actions such as providing additional information, instructing the agent to read from a different script, offer additional products or services to the customer, etc.

As illustrated in FIG. 6, initiating an action 632 may involve one or more sub steps. Flow 600 provides some examples of steps that may be performed as part of initiating an action 632. For example, feedback can be provided to an agent at step 636, feedback can be provided to a third party (e.g., a supervisor) at step 640, a third party (e.g., supervisor or expert) may be included in the communication session at step 644, additional information can be requested from a customer at step 648, additional information can be provided to a customer at step 652, an agent can be instructed to read from a different script at step 656, or different products or services can be offered to a customer at step 660. It is noted that although FIG. 6 provides some specific examples of sub steps, embodiments are not necessarily limited thereto. In other embodiments, step 632 may involve other sub steps not illustrated in FIG. 6 such as changing agents, establishing another communication session with the customer using a different communication mode, provide the customer with promotional information (e.g., free product or service) and/or other actions. Flow 600 ends at 664.

Figure 7:
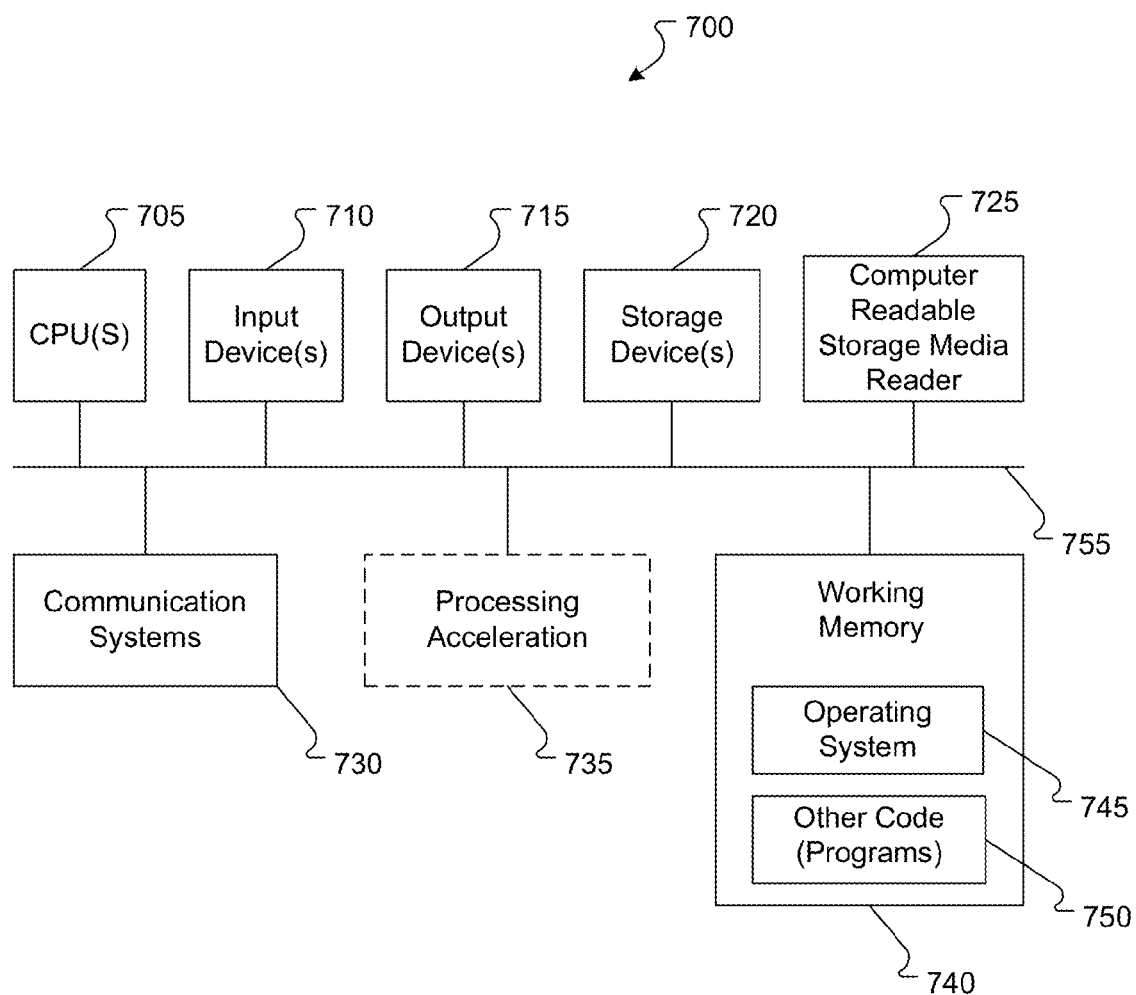
FIG. 7 is a block diagram of an embodiment of a computer or computing system environment operable to execute as the one or more devices described herein.

FIG. 7 illustrates one embodiment of a computer system 700 upon which computing devices or other systems described herein may be deployed or executed. The computer system 700 is shown comprising hardware elements that may be electrically coupled via a bus 755. The hardware elements may include one or more central processing units (CPUs)

705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable media reader 725 can further be connected to a computer-readable medium, together (and, optionally, in combination with storage device(s) 720) comprehensively representing remote, local, fixed, and/or removable storage devices plus a computer-readable medium for temporarily and/or more permanently containing computer-readable information. The communications system 730 may permit data to be exchanged with the network 520 and/or any other computer described above with respect to the system 700.

The computer system 700 may also comprise software elements, shown as being currently located within a working memory 740, including an operating system 745 and/or other code 750, such as application code implementing the servers or devices described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the application code or code segments to perform the necessary tasks may be stored in a machine readable medium such as storage medium. A processor(s) may perform the necessary tasks. A code segment may represent a procedure, a function, a subprogram, an application, a routine, a subroutine, a module, a software package, a class, or any combination of instructions, data structures, or application statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for managing voice communications in a contact center, comprising:
    establishing, by at least one processor, an electronic voice communication session between a human agent at a first communication device and a customer at a second communication device; and
    during the electronic voice communication session between the human agent and the customer:
        receiving, by the at least one processor, an indication of customer feedback regarding the electronic voice communication session, wherein the indication of customer feedback is based on analyzing the electronic voice communication session for one or more keywords to detect speech patterns of the customer that comprise the customer repeating themselves; and
        initiating, by the at least one processor, an action during the electronic voice communication session between the human agent and the customer, wherein the action is one of recording the electronic voice communication session between the human agent and the customer at a time when the customer repeated themselves or parsing the electronic voice communication session at the time of the customer repeated themselves; and
    in response to initiating the action, one of playing back, by the at least one processor, the recorded electronic voice communication session at the time the customer repeated themselves or marking with an indicator the parsed electronic voice communication session at the time when the customer repeated themselves.

2. The method of claim 1, wherein the indication of customer feedback further comprises receiving feedback from one or more of an instant message (IM), an email, a short message service (SMS) message, a multimedia message service (MMS) message, a feedback webpage, dual-tone multi-frequency signaling key codes, a social network, and a chat link.

3. The method of claim 1, further comprising receiving, by the at least one processor, additional customer feedback in response to sending a request to the customer for the customer feedback.

4. The method of claim 1, further comprising providing, by the at least one processor, a menu to the customer for receiving the customer feedback.

5. The method of claim 1, further comprising:
before initiating the action, the at least one processor determining, based on the customer feedback and predetermined rules, the action to be initiated.

6. The method of claim 5, wherein the identity of the customer is used in determining the action to be initiated.

7. The method of claim 1, wherein the action comprises one of:
providing the customer feedback to the human agent;
providing the customer feedback to a third party;
including the third party in the electronic voice communication session; and
prompting the customer for additional feedback.

8. A communication system, comprising:
a non-transitory computer readable medium;
a processor;
an application stored in the computer readable medium and running on the processor, wherein the application:
establishes an electronic voice communication session between a human agent at a first communication device and a customer at a second communication device; and
during the electronic voice communication session between the human agent and the customer: receives an indication of customer feedback regarding the electronic voice communication session, wherein the indication of customer feedback is based on analyzing the electronic voice communication session for one or more keywords to detect speech patterns of the customer that comprise the customer repeating themselves; and
a recorder that in response to determining that an action should be performed based on the customer repeating themselves, one of records the electronic voice communication session between when the customer repeated themselves or parses the electronic voice communication session at the time the customer repeated themselves; and one of plays back the recorded electronic voice communication session at the time the customer repeated themselves or marks with an indicator the parsed electronic voice communication session at the time the customer repeated themselves.

9. The communication system of claim 8, wherein the application further:
identifies the customer using stored customer information, wherein the action is determined based in part by the stored customer information.

10. The communication system of claim 8, wherein the application further:
records a time during the electronic voice communication session at which the customer feedback was received.

11. A computer readable medium comprising computer executable instructions stored onto the computer readable medium which, when executed by one or more processors of a computer, causes the computer to perform a method of receiving customer feedback, the method comprising:
establishing an electronic voice communication session between a human agent at a first communication device and a customer at a second communication device;
during the electronic voice communication session between the human agent and the customer:
receiving an indication of customer feedback regarding the electronic voice communication session, wherein the indication of customer feedback is based on analyzing the electronic voice communication session for one or more keywords to detect speech patterns of the customer that comprise the customer repeating themselves; and
initiating a mitigation action during the electronic voice communication session between the human agent and the customer, wherein the mitigation action is one of recording the electronic voice communication session between the human agent and the customer at a time when the customer repeated themselves or parsing the electronic voice communication session between at the time the customer repeated themselves; and
one of playing back the recorded electronic voice communication at the time the customer repeated themselves or marking with an indicator the parsed electronic voice communication session at the time the customer repeated themselves.

12. The computer readable medium of claim 11, wherein the method further comprises:
identifying the customer using stored customer information, wherein the mitigation step is determined based in part on the stored customer information.

13. The method of claim 1, wherein the indication of customer feedback provided during the electronic voice communication session between the human agent and the customer results in the human agent changing a script to provide different information to the customer.

14. The method of claim 1, further comprising:
determining, by the at least one processor, a time that the indication of customer feedback was provided during the electronic voice communication session; and
in response to the determined time, modifying, by the at least one processor, a portion of a script that the human agent was reading at the determined time.

15. The method of claim 1 further comprising:
recording, by the at least one processor, a plurality of electronic communication sessions between a plurality of customers and a plurality of human agents;
receiving, by the at least one processor, a plurality of indications of customer feedback regarding the plurality of electronic communication sessions;
identifying, by the at least one processor, in the plurality of electronic communication sessions, a keyword that was spoken at a time when at least two of the plurality of indications of customer feedback were received; and
identifying, by the at least one processor, a trend based on the identified keyword.

16. The method of claim 1, further comprising receiving, by the at least one processor, customer feedback via dual-tone multi-frequency (DTMF) tones and wherein the DTMF tones are filtered so that the human agent does not hear the DTMF tones.

17. The method of claim 1, wherein the action performed based on the customer feedback in the electronic voice communication session further comprises directing, by the at least one processor, the customer to an online web chat or web cast that is currently active or will be active in the future.

18. The method of claim 1, wherein the indication of customer feedback is that the customer perceives that the human agent lacks expertise and wherein the action further comprises conferencing, by the at least one processor, an expert onto the electronic voice communication session.

19. The method of claim 1, wherein the action is recording the electronic voice communication session between the human agent and the customer and wherein the one of playing back the electronic voice communication session at the time the customer repeated themselves or marking with the indicator the parsed electronic voice communication session at the time when the customer repeated themselves is playing back the electronic voice communication session at the time the customer repeated themselves.

20. The method of claim 1, wherein the action is parsing the electronic voice communication session at the time the customer repeated themselves and wherein the one of playing back the electronic voice communication session at the time the customer repeated themselves or marking with the indicator the parsed electronic voice communication session at the time when the customer repeated themselves is marking with the indicator the parsed electronic voice communication session at the time when the customer repeated themselves.

* * * * *